(12) United States Patent
Wöhlte et al.

(10) Patent No.: US 11,199,611 B2
(45) Date of Patent: Dec. 14, 2021

(54) VEHICLE RADAR SYSTEM WITH T-SHAPED SLOT ANTENNAS

(71) Applicant: Magna Electronics Inc., Auburn Hills, MI (US)

(72) Inventors: Wilhelm Johann Wolfgang Wöhlte, Sailauf (DE); Fabrizio Gentili, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 373 days.

(21) Appl. No.: 16/280,278

(22) Filed: Feb. 20, 2019

(65) Prior Publication Data

US 2019/0257918 A1    Aug. 22, 2019

Related U.S. Application Data

(60) Provisional application No. 62/632,695, filed on Feb. 20, 2018.

(51) Int. Cl.
   *G01S 7/03*      (2006.01)
   *G01S 13/931*    (2020.01)
   *H01Q 13/10*     (2006.01)
   *H01Q 1/32*      (2006.01)
   *B60Q 9/00*      (2006.01)
   (Continued)

(52) U.S. Cl.
   CPC ............. *G01S 7/032* (2013.01); *G01S 7/03* (2013.01); *G01S 13/931* (2013.01); *H01Q 1/3233* (2013.01); *H01Q 1/3283* (2013.01); *H01Q 13/10* (2013.01); *B60Q 9/00* (2013.01); *G01S 13/87* (2013.01); *G01S 2013/93271* (2020.01); *G01S 2013/93275* (2020.01); *G05D 1/0257* (2013.01)

(58) Field of Classification Search
   CPC .......... G01S 7/03; G01S 7/032; G01S 13/931; H01Q 13/00; H01Q 13/0233; H01Q 13/0241; H01Q 13/085; H01Q 13/10; H01Q 13/106
   See application file for complete search history.

(56) References Cited

U.S. PATENT DOCUMENTS 3,503,073 A * 3/1970 Ajioka ................ H01Q 25/04
                                                    343/771
3,696,433 A * 10/1972 Killion ................ H01Q 13/16
                                                    343/770
(Continued)

*Primary Examiner* — Peter M Bythrow
(74) *Attorney, Agent, or Firm* — Honigman LLP

(57) ABSTRACT

A radar sensing system for a vehicle includes a radar sensor disposed at the vehicle so as to have a field of sensing exterior of the vehicle. The radar sensor includes a plurality of transmitters that transmit radio signals, a plurality of receivers that receive radio signals, and a plurality of antennas that communicate the radio signals to the receivers and from the transmitters. The received radio signals are transmitted radio signals that are reflected from an object. A processor is operable to process outputs of the receivers to detect the object. At least some of the antennas of the radar sensor include non-rectangular slot antennas each having a slot that includes a longitudinal portion and a transverse portion that extends transverse in at least one direction from the longitudinal portion. The non-rectangular slot provides an enhanced radiation pattern of the transmitted radio signals.

17 Claims, 12 Drawing Sheets

(51) Int. Cl.
*G05D 1/02* (2020.01)
*G01S 13/87* (2006.01)

(56) References Cited

U.S. PATENT DOCUMENTS

| | | | | |
|---|---|---|---|---|
| 3,936,836 | A * | 2/1976 | Wheeler | H01Q 21/0056 343/771 |
| 3,969,730 | A * | 7/1976 | Fuchser | H01Q 1/42 343/770 |
| 4,164,742 | A * | 8/1979 | Nemit | H01Q 25/02 343/768 |
| 4,247,858 | A * | 1/1981 | Eichweber | G01S 13/762 250/227.31 |
| 4,373,162 | A * | 2/1983 | Peterson | H01Q 21/0043 343/767 |
| 4,489,328 | A * | 12/1984 | Gears | H01Q 1/38 343/700 MS |
| 4,513,291 | A * | 4/1985 | Drabowitch | H01Q 21/0043 343/771 |
| 4,644,343 | A * | 2/1987 | Schneider | H01Q 21/0043 343/767 |
| 4,821,044 | A * | 4/1989 | Kurtz | H01Q 21/005 343/771 |
| 4,845,506 | A * | 7/1989 | Shibata | G01S 13/60 343/713 |
| 4,916,458 | A * | 4/1990 | Goto | H01Q 21/064 343/771 |
| 4,939,527 | A * | 7/1990 | Lamberty | H01Q 21/0018 343/754 |
| 5,008,678 | A * | 4/1991 | Herman | G01S 13/87 342/158 |
| 5,404,146 | A * | 4/1995 | Rutledge | H01Q 13/10 343/720 |
| 5,467,072 | A | 11/1995 | Michael | |
| 5,596,337 | A * | 1/1997 | Merenda | H01Q 21/0075 343/770 |
| 5,638,079 | A * | 6/1997 | Kastner | H01Q 13/22 343/768 |
| 5,657,023 | A | 8/1997 | Lewis et al. | |
| 5,757,329 | A * | 5/1998 | Hoover | H01Q 13/18 29/600 |
| 6,445,354 | B1 * | 9/2002 | Kunysz | G03F 7/091 343/770 |
| 6,507,321 | B2 * | 1/2003 | Oberschmidt | H01Q 13/106 343/767 |
| 6,587,186 | B2 | 7/2003 | Bamji et al. | |
| 6,642,908 | B2 * | 11/2003 | Pleva | G01S 7/023 343/876 |
| 6,674,895 | B2 | 1/2004 | Rafii et al. | |
| 6,678,039 | B2 | 1/2004 | Charbon | |
| 6,690,354 | B2 | 2/2004 | Sze | |
| 6,710,770 | B2 | 3/2004 | Tomasi et al. | |
| 6,825,455 | B1 | 11/2004 | Schwarte | |
| 6,876,775 | B2 | 4/2005 | Torunoglu | |
| 6,906,793 | B2 | 6/2005 | Bamji et al. | |
| 6,919,549 | B2 | 7/2005 | Bamji et al. | |
| 6,977,621 | B2 * | 12/2005 | Kelly | H01Q 1/3275 343/711 |
| 7,053,357 | B2 | 5/2006 | Schwarte | |
| 7,071,890 | B2 * | 7/2006 | Tanaka | H01Q 15/0006 343/756 |
| 7,157,685 | B2 | 1/2007 | Bamji et al. | |
| 7,176,438 | B2 | 2/2007 | Bamji et al. | |
| 7,203,356 | B2 | 4/2007 | Gokturk et al. | |
| 7,212,663 | B2 | 5/2007 | Tomasi | |
| 7,283,213 | B2 | 10/2007 | O'Connor et al. | |
| 7,310,431 | B2 | 12/2007 | Gokturk et al. | |
| 7,321,111 | B2 | 1/2008 | Bamji et al. | |
| 7,340,077 | B2 | 3/2008 | Gokturk et al. | |
| 7,352,454 | B2 | 4/2008 | Bamji et al. | |
| 7,375,803 | B1 | 5/2008 | Bamji | |
| 7,379,100 | B2 | 5/2008 | Gokturk et al. | |
| 7,379,163 | B2 | 5/2008 | Rafii et al. | |
| 7,405,812 | B1 | 7/2008 | Bamji | |
| 7,408,627 | B2 | 8/2008 | Bamji et al. | |
| 7,656,359 | B2 * | 2/2010 | Haziza | H01Q 13/00 343/772 |
| 8,013,780 | B2 | 9/2011 | Lynam | |
| 8,027,029 | B2 | 9/2011 | Lu et al. | |
| 8,134,514 | B2 * | 3/2012 | Yamaguchi | H01Q 21/005 343/770 |
| 8,149,177 | B1 * | 4/2012 | Callus | H01Q 1/286 343/771 |
| 8,665,142 | B2 * | 3/2014 | Shijo | H01Q 21/064 342/175 |
| 8,830,133 | B2 * | 9/2014 | Weily | H01Q 19/10 343/770 |
| 8,866,687 | B2 * | 10/2014 | Biancotto | H01Q 21/064 343/776 |
| 8,970,428 | B2 * | 3/2015 | Yano | H01Q 21/005 342/175 |
| 9,036,026 | B2 | 5/2015 | Dellantoni et al. | |
| 9,146,898 | B2 | 9/2015 | Ihlenburg et al. | |
| 9,270,028 | B2 | 2/2016 | Ruvinsky et al. | |
| 9,575,160 | B1 | 2/2017 | Davis et al. | |
| 9,599,702 | B1 | 3/2017 | Bordes et al. | |
| 9,612,317 | B2 * | 4/2017 | Izadian | H01P 5/182 |
| 9,689,967 | B1 | 6/2017 | Stark et al. | |
| 9,753,121 | B1 | 9/2017 | Davis et al. | |
| 9,766,605 | B1 * | 9/2017 | Izadian | H01Q 21/005 |
| 10,082,570 | B1 * | 9/2018 | Izadian | H01Q 21/064 |
| 10,263,310 | B2 * | 4/2019 | Kildal | H01Q 13/106 |
| 10,394,204 | B1 * | 8/2019 | Izadian | H01Q 21/0043 |
| 10,641,867 | B2 | 5/2020 | Hess | |
| 2007/0013596 | A1 * | 1/2007 | Fukuchi | H01Q 13/10 343/767 |
| 2007/0080878 | A1 * | 4/2007 | McLean | H01Q 13/106 343/725 |
| 2010/0245066 | A1 | 9/2010 | Sarioglu et al. | |
| 2011/0090129 | A1 * | 4/2011 | Weily | H01Q 21/24 343/770 |
| 2011/0187614 | A1 * | 8/2011 | Kirino | H01Q 3/32 343/713 |
| 2012/0115429 | A1 | 5/2012 | Falk | |
| 2013/0169498 | A1 * | 7/2013 | Chen | H01Q 13/10 343/770 |
| 2015/0145695 | A1 | 5/2015 | Hyde et al. | |
| 2016/0028164 | A1 * | 1/2016 | Watanabe | H01Q 1/36 343/771 |
| 2016/0033640 | A1 | 2/2016 | De Mersseman et al. | |
| 2016/0084941 | A1 | 3/2016 | Arage | |
| 2017/0016980 | A1 * | 1/2017 | Chou | G01S 7/42 |
| 2017/0187124 | A1 * | 6/2017 | Kirino | H01Q 1/3266 |
| 2017/0194716 | A1 * | 7/2017 | Kirino | H01Q 13/10 |
| 2017/0222311 | A1 | 8/2017 | Hess et al. | |
| 2017/0237177 | A1 * | 8/2017 | Kirino | H01Q 13/24 343/745 |
| 2017/0254873 | A1 | 9/2017 | Koravadi | |
| 2017/0276788 | A1 * | 9/2017 | Wodrich | G01S 13/931 |
| 2017/0310004 | A1 | 10/2017 | Swirhun et al. | |
| 2017/0315231 | A1 | 11/2017 | Wodrich | |
| 2017/0356994 | A1 | 12/2017 | Wodrich et al. | |
| 2018/0015875 | A1 | 1/2018 | May et al. | |
| 2018/0045812 | A1 | 2/2018 | Hess | |
| 2018/0219297 | A1 * | 8/2018 | Chen | H01Q 7/00 |
| 2018/0231635 | A1 | 8/2018 | Woehlte | |
| 2018/0301017 | A1 * | 10/2018 | Ichinose | G01S 7/03 |
| 2018/0301819 | A1 * | 10/2018 | Kirino | H01Q 13/10 |
| 2019/0006766 | A1 * | 1/2019 | Yonei | H01Q 13/106 |
| 2019/0324134 | A1 * | 10/2019 | Cattle | G01S 13/931 |
| 2019/0339363 | A1 | 11/2019 | Hess et al. | |
| 2020/0058987 | A1 * | 2/2020 | Pelletti | G01S 7/032 |
| 2020/0059007 | A1 * | 2/2020 | Wang | H01Q 21/005 |

\* cited by examiner

| Parameter | Value |
|---|---|
| Substrate $\varepsilon_r$ | 3.152 |
| Substrate loss tangent | 0.0015 |
| Substrate thickness | 0.160 mm |
| Via spacing (center/center) | 0.4 mm |
| Via diameter | 0.1 mm |

FIG. 3

| Parameter | Value |
|---|---|
| l | 2.44 mm |
| w | 0.152 mm |
| l2 | 0.254 mm |
| l1 | 1.093 mm |
| w1 | 0.406 |

FIG. 8

VEHICLE RADAR SYSTEM WITH T-SHAPED SLOT ANTENNAS

CROSS REFERENCE TO RELATED APPLICATION

The present application claims the filing benefits of U.S. provisional application Ser. No. 62/632,695, filed Feb. 20, 2018, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of imaging and radar sensors in vehicle imaging systems is common and known. Examples of such known systems are described in U.S. Pat. No. 8,013,780, which is hereby incorporated herein by reference in its entirety.

SUMMARY OF THE INVENTION

The present invention provides a driving assistance system or sensing system or control system for a vehicle that utilizes one or more radar sensors to sense regions exterior of the vehicle, with the radar sensor that transmits and receives signals, with the received signals processed to detect the presence of objects at or near the vehicle in the field of sensing of the sensor. The system includes a processor operable to process outputs of the receivers. The radar sensor also includes at least one antenna and at least some of the antennas is based on non-rectangular slot antenna waveguides with the waveguides comprising slots having a longitudinal portion and a transverse portion that extends transverse in at least one direction from the longitudinal portion.

These and other objects, advantages, purposes and features of the present invention will become apparent upon review of the following specification in conjunction with the drawings.

BRIEF DESCRIPTION OF THE DRAWINGS

FIG. 3 is a table of antenna parameters;

FIG. 8 is a table of antenna parameters for a T-shaped slot antenna in accordance with the present invention;

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
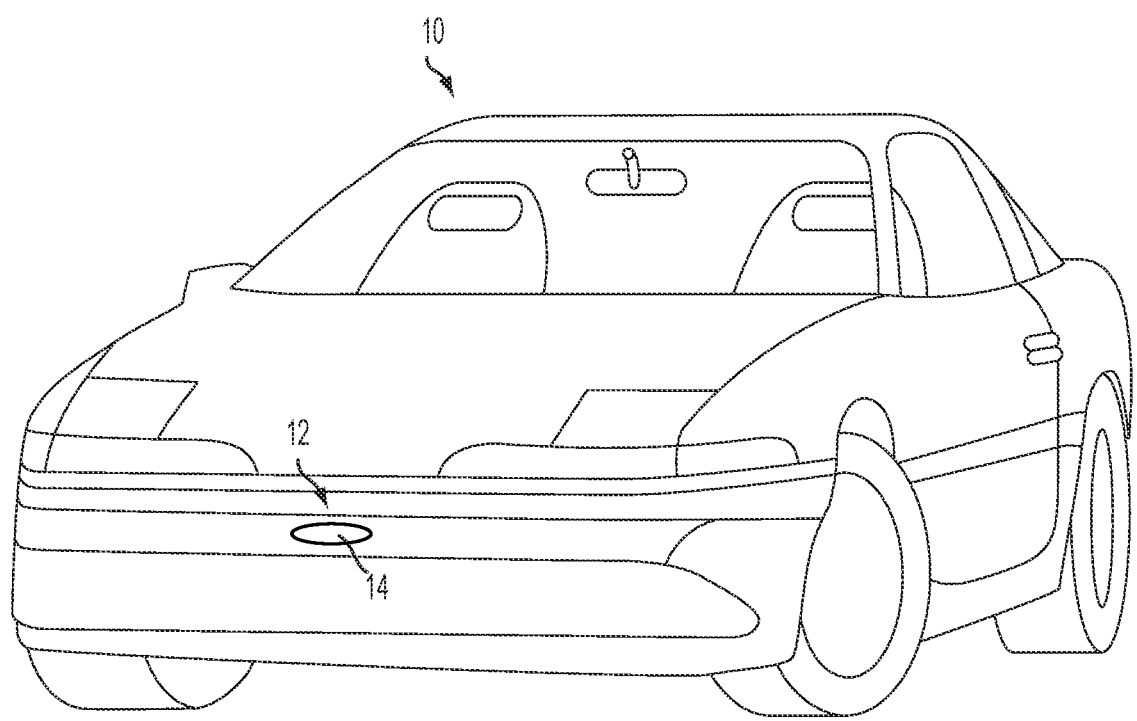
FIG. 1 is a perspective view of a vehicle with a sensing system that incorporates a radar sensor in accordance with the present invention.

Referring now to the drawings and the illustrative embodiments depicted therein, a vehicle 10 (FIG. 1) includes a driving assistance system or sensing system 12 that includes at least one radar sensor unit, such as a forward facing radar sensor unit 14 (and the system may optionally include multiple exterior facing sensors, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Figure 2:
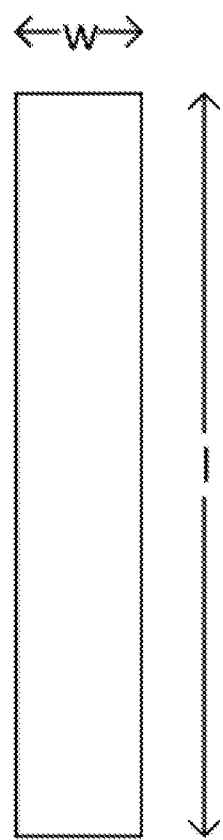
FIG. 2 is a plan view of a classic slot antenna.
Figure 4:
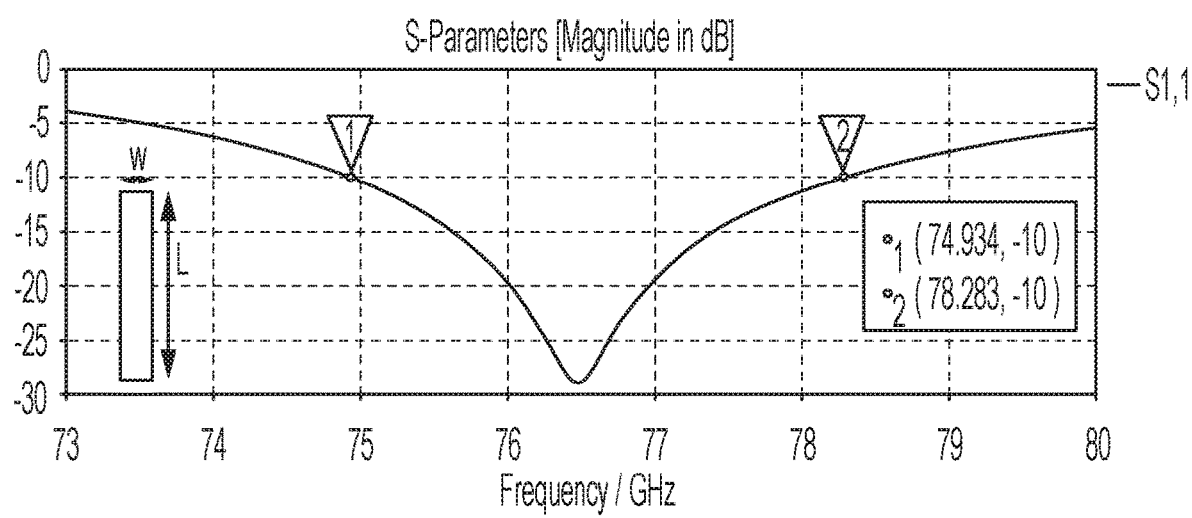
FIG. 4 is a graph of bandwidth of a classic slot antenna.
Figure 5:
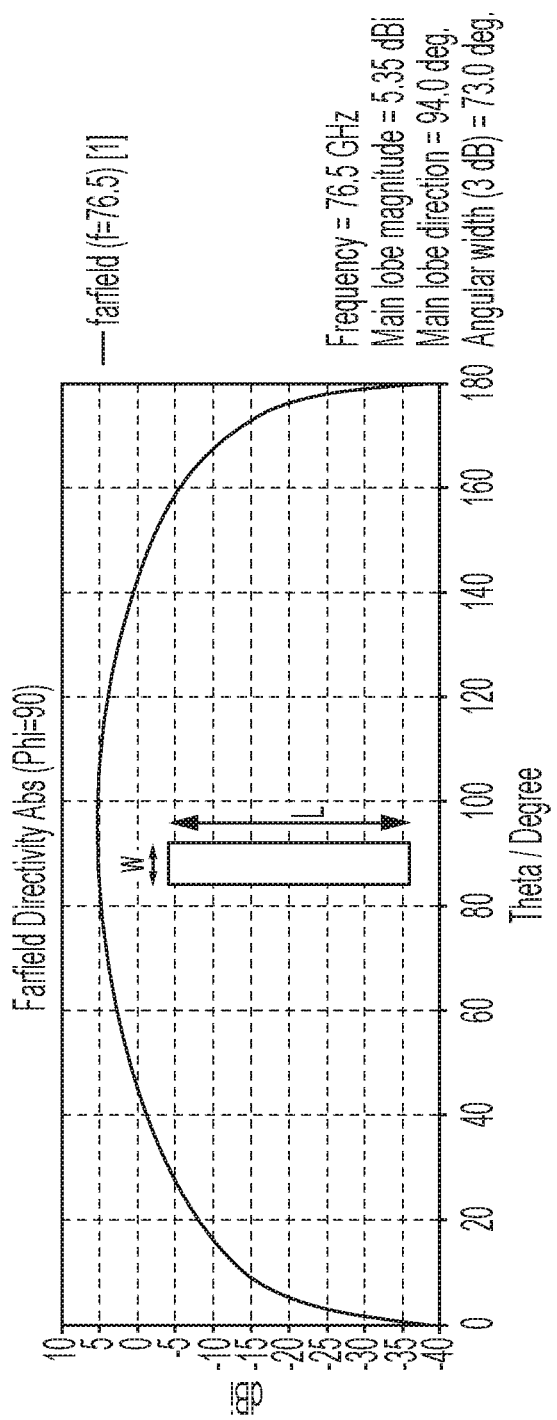
FIG. 5 is a graph of directivity or radiation pattern in elevation of a classic slot antenna.
Figure 6:
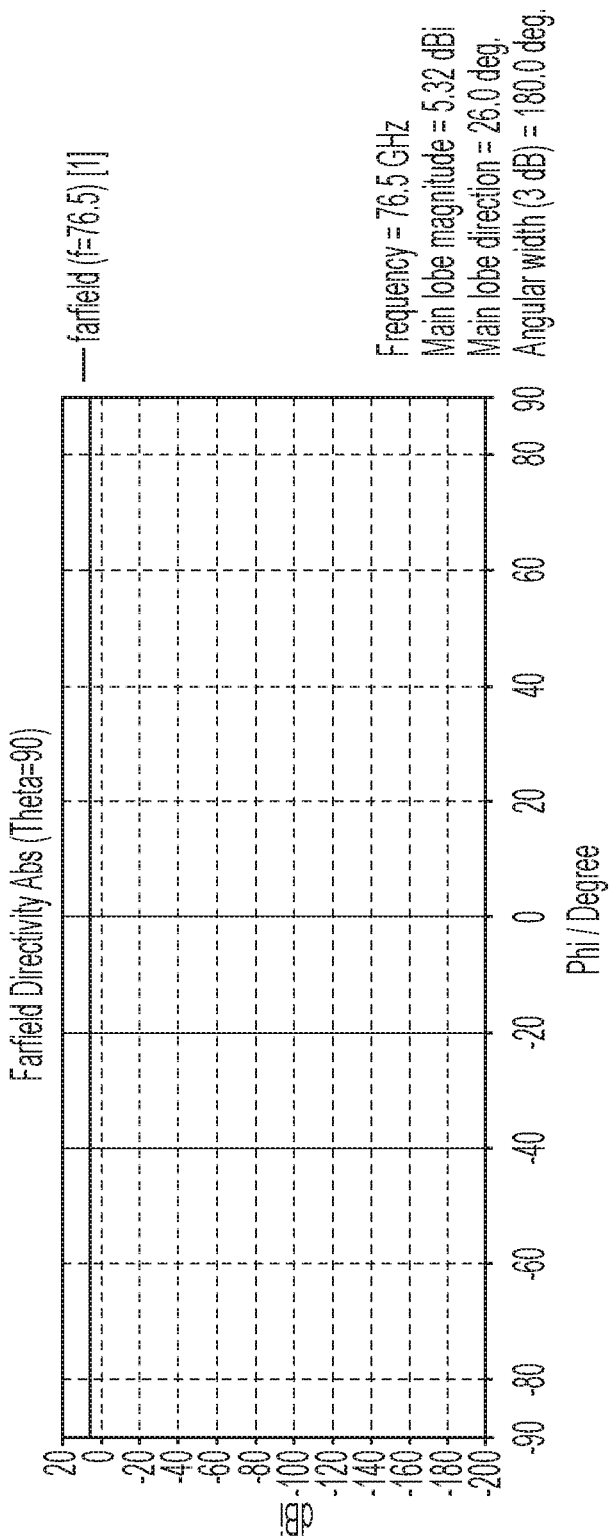
FIG. 6 is a graph of directivity or radiation pattern in azimuth of a classic slot antenna.

Classical or current slot antenna structures are manufactured as or with or in rectangular slots (see FIG. 2). As shown in FIG. 2, l refers to the length of the slot, and w refers to the width of the slot. As shown in FIG. 4, a classic slot antenna with a length of 2.34 mm and a width of 0.152 mm, the input matching is better than −10 dB with a bandwidth of 3.36 GHz (from 74.93 GHz to 78.28 GHz). FIG. 4 represents results of electromagnetic (EM) simulations with additional parameters found in FIG. 3. As shown in FIG. 5, the same classic slot antenna has a 5.35 dB directivity at the antenna boresight. The same classic slot antenna produces an azimuth radiation pattern as shown in FIG. 6.

Figure 7:
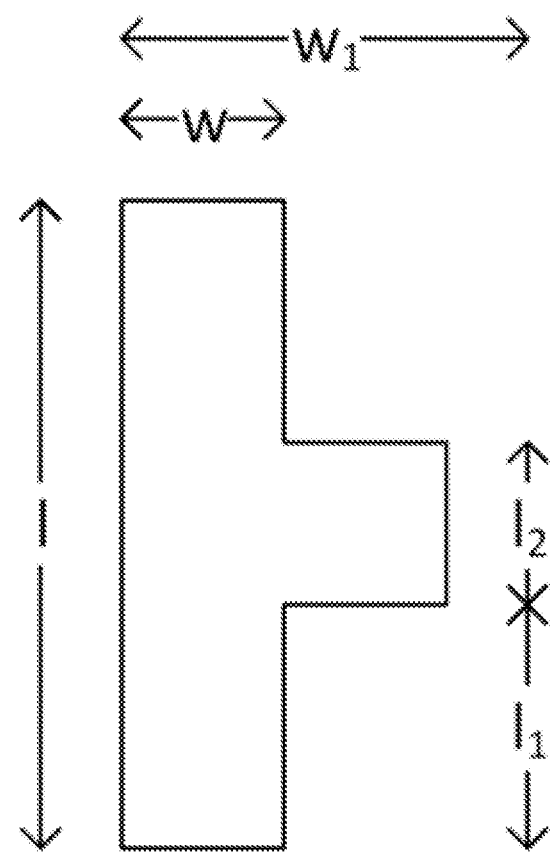
FIG. 7 is a plan view of a T-shaped slot antenna in accordance with the present invention.
Figure 9:
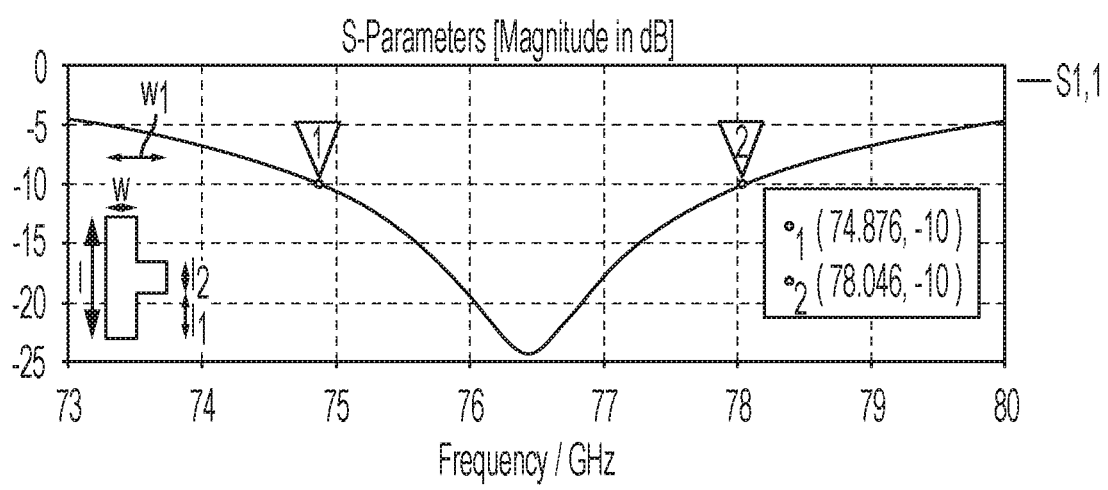
FIG. 9 is a graph of bandwidth of a T-shaped slot antenna in accordance with the present invention.
Figure 10:
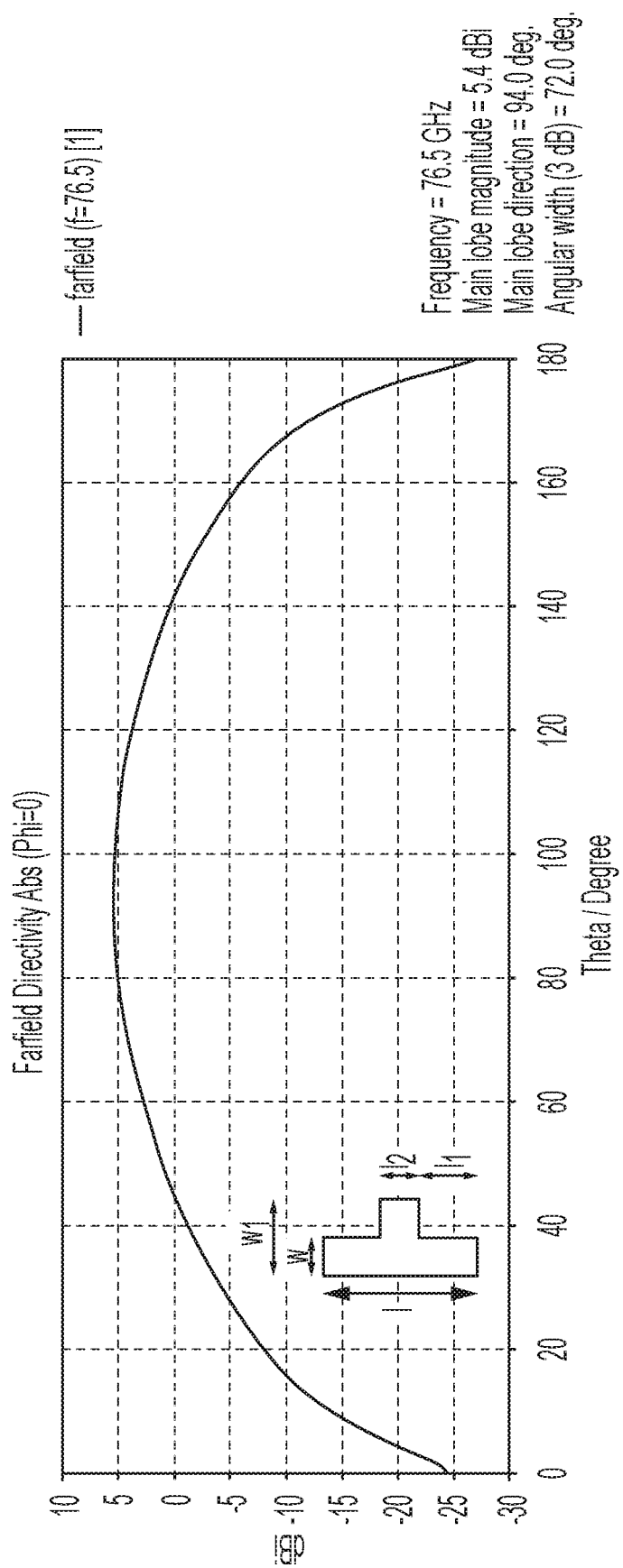
FIG. 10 is a graph of directivity or radiation pattern in elevation of a T-shaped slot antenna in accordance with the present invention.
Figure 11:
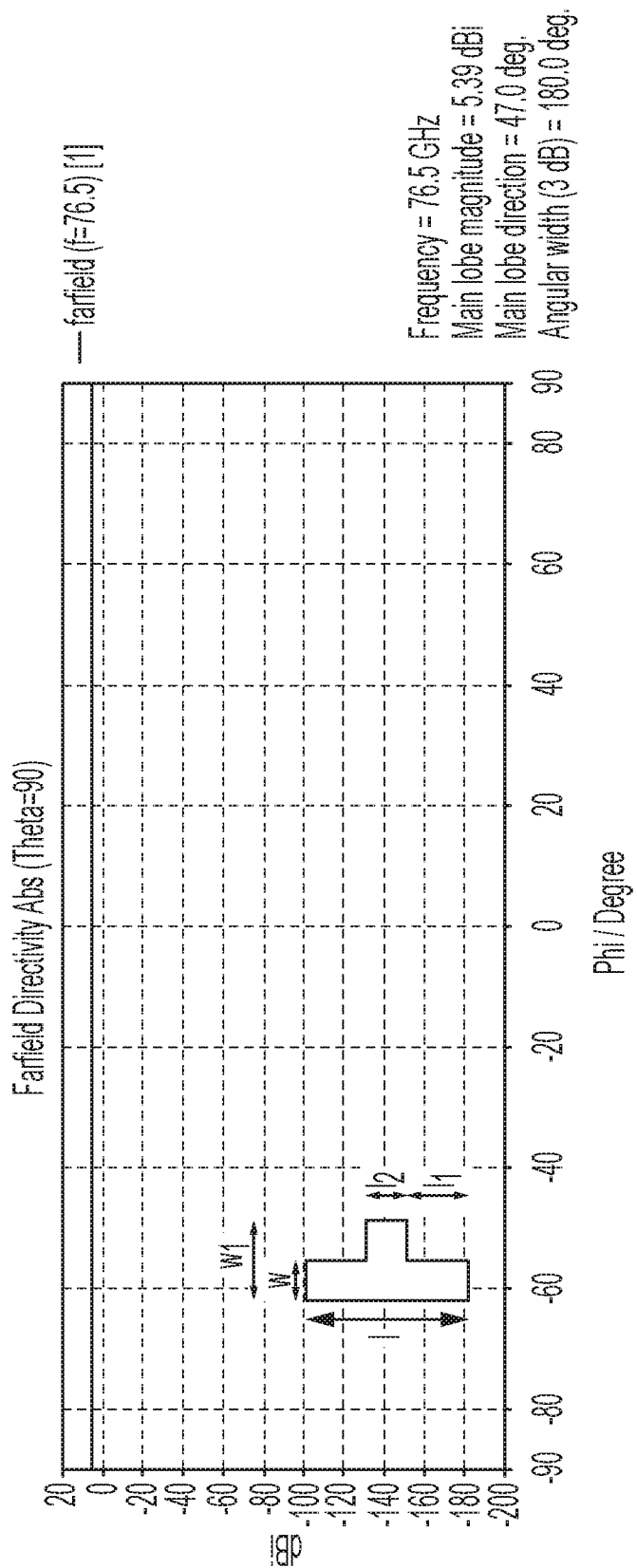
FIG. 11 is a graph of directivity radiation pattern in azimuth of a T-shaped slot antenna in accordance with the present invention.

In accordance with the present invention, a substrate integrated waveguide T-shaped slot antenna (i.e., a radar antenna having a T-shaped or irregular-shaped slot) is provided (see FIG. 7). Such an antenna provides more openings and a reduced antenna matching (e.g., from 3.36 GHz to 3.17 GHz). The T-shaped slot antenna of FIG. 7, when simulated with parameters found in FIG. 8, produces input matching of better than −10 dB with a bandwidth of 3.17 GHz from 74.87 GHz to 78.04 GHz (see FIG. 9). The T-shaped slot antenna, as shown in FIG. 10, produces 5.4 dB directivity at the antenna boresight. The same T-shaped slot antenna produces an azimuth radiation pattern as shown in FIG. 11. Such a T-shaped slot antenna provides more directive radiation pattern than a classic slot antenna.

Figure 12:
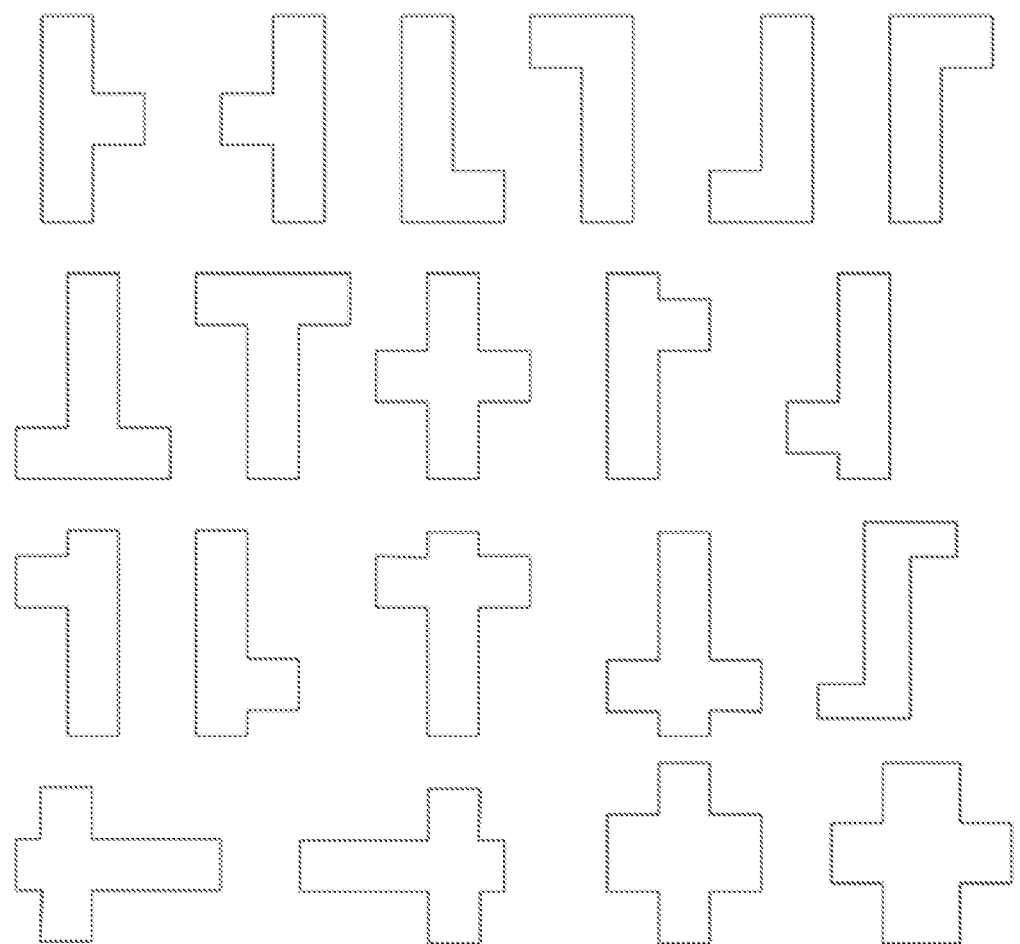
FIG. 12 is a plan view of a variety of T-shaped slot antennas and other alternative shapes.

As used herein, the term "T-shaped slot antenna" is intended to encompass any non-rectangular-shaped slot in an antenna or a waveguide of an antenna, with the slot(s) having a longitudinal portion and a transverse portion that extends transverse in at least one direction from the longitudinal portion. As shown in FIG. 12, the T-shaped slots of the antenna and/or waveguide of the present invention may be formed in a variety of non-rectangular shapes, including generally L-shaped slots and S-shaped or Z-shaped slots and/or the like.

In some examples, the transverse portion of the slot of the non-rectangular slot antenna is centered along the longitudinal portion (FIG. 7). As also illustrated in FIG. 7, the transverse portion may extend transverse in at least two directions from the longitudinal portion. A width of the transverse portion may be greater than a width of the longitudinal portion (FIG. 8). A length of the longitudinal portion may be greater than twice a length of the transverse portion (FIG. 8).

The antenna thus comprises one or more of irregular-shaped slots established along a conductive plate (or optionally at a waveguide of the antenna). The radar signals are emitted through the slots, with the slots affecting a radiation pattern of the antenna. The irregular shape or non-rectangular shape or T-shape of the slots provide enhanced range and function of the radar sensor.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A radar sensing system for a vehicle, said radar sensing system comprising:
 a radar sensor disposed at a vehicle so as to have a field of sensing exterior of the vehicle;
 wherein said radar sensor comprises a plurality of transmitters that transmit radio signals via a plurality of antennas, a plurality of receivers that receive radio signals via the plurality of antennas, and wherein the received radio signals are transmitted radio signals that are reflected from an object present in the field of sensing of said radar sensor;
 a processor operable to process outputs of said receivers to detect the object present in the field of sensing of said radar sensor; and
 wherein at least some antennas of the plurality of antennas comprise non-rectangular slot antennas each having a T-shaped slot consisting of a single longitudinal portion and a single transverse portion that extends transverse in one direction from the longitudinal portion, and wherein a width of the transverse portion is less than a length of the longitudinal portion.

2. The radar sensing system of claim 1, wherein each of the non-rectangular slot antennas provides a greater directive radiation pattern than a rectangular slot shaped antenna.

3. The radar sensing system of claim 1, wherein each of the non-rectangular slot antennas provides reduced antenna matching relative to a rectangular slot shaped antenna.

4. The radar sensing system of claim 1, wherein at least one of the non-rectangular slot antennas has a greater than 5 dB directivity at an antenna boresight of the at least one of the non-rectangular slot antennas.

5. The radar sensing system of claim 1, wherein at least one antenna of the plurality of antennas comprises an S-shaped slot antenna.

6. The radar sensing system of claim 1, wherein at least one of the non-rectangular slot antennas comprises an input matching of greater than −10 dB.

7. The radar sensing system of claim 1, wherein each of the non-rectangular slot antennas comprises more openings than a rectangular slot shaped antenna.

8. The radar sensing system of claim 1, wherein each of the non-rectangular slot antennas comprise a substrate integrated non-rectangular slot antenna.

9. The radar sensing system of claim 1, wherein the width of the transverse portion of at least one of the non-rectangular slot antennas is greater than a width of the longitudinal portion.

10. The radar sensing system of claim 1, wherein the length of the longitudinal portion is greater than twice a length of the transverse portion.

11. The radar sensing system of claim 1, wherein said processor is part of a driving assist system of the vehicle, and wherein said driving assist system controls at least one function of the vehicle responsive to said processor processing the outputs of said receivers.

12. A radar sensing system for a vehicle, said radar sensing system comprising:
 a radar sensor disposed at a vehicle so as to have a field of sensing exterior of the vehicle;
 wherein said radar sensor comprises a plurality of transmitters that transmit radio signals via a plurality of antennas, a plurality of receivers that receive radio signals via the plurality of antennas, and wherein the received radio signals are transmitted radio signals that are reflected from an object present in the field of sensing of said radar sensor;
 a processor operable to process outputs of said receivers to detect the object present in the field of sensing of said radar sensor;
 wherein at least some antennas of the plurality of antennas comprise non-rectangular slot antennas each having a T-shaped slot consisting of a single longitudinal portion and a single transverse portion that extends transverse in one direction from the longitudinal portion, and wherein a width of the transverse portion is less than a length of the longitudinal portion;
 wherein at least one of the non-rectangular slot antennas comprises a radiation pattern that is more directive relative to a rectangular slot shaped antenna; and
 wherein said processor is part of a driving assist system of the vehicle, and wherein said driving assist system controls at least one function of the vehicle responsive to said processor processing the outputs of said receivers.

13. The radar sensing system of claim 12, wherein each of the non-rectangular slot antennas provides a greater directive radiation pattern than a rectangular slot shaped antenna.

14. The radar sensing system of claim 12, wherein each of the non-rectangular slot antennas provides reduced antenna matching relative to a rectangular slot shaped antenna.

15. The radar sensing system of claim 12, wherein the width of the transverse portion of at least one of the non-rectangular slot antennas is greater than a width of the longitudinal portion.

16. A radar sensing system for a vehicle, said radar sensing system comprising:
 a radar sensor disposed at a vehicle so as to have a field of sensing exterior of the vehicle;
 wherein said radar sensor comprises a plurality of transmitters that transmit radio signals via a plurality of antennas, a plurality of receivers that receive radio signals via the plurality of antennas, and wherein the received radio signals are transmitted radio signals that are reflected from an object present in the field of sensing of said radar sensor;
 a processor operable to process outputs of said receivers to detect the object present in the field of sensing of said radar sensor;
 wherein at least some antennas of the plurality of antennas comprise non-rectangular slot antennas each having a T-shaped slot consisting of a single longitudinal portion and a single transverse portion that extends transverse in one direction from the longitudinal portion, and wherein a width of the transverse portion is less than a length of the longitudinal portion;
 wherein each of the non-rectangular slot antennas provides a greater directive radiation pattern than a rectangular slot shaped antenna;
 wherein each of the non-rectangular slot antennas provides reduced antenna matching relative to a rectangular slot shaped antenna; and
 wherein said processor is part of a driving assist system of the vehicle, and wherein said driving assist system controls at least one function of the vehicle responsive to said processor processing the outputs of said receivers.

17. The radar sensing system of claim 16, wherein at least one of the non-rectangular slot antennas has a greater than 5 dB directivity at an antenna boresight of the at least one of the non-rectangular slot antennas.

* * * * *